United States Patent [19]
Olson

[11] 3,707,938
[45] Jan. 2, 1973

[54] SELF-PROPELLED WATER VEHICLE

[76] Inventor: John R. Olson, P.O. Box 689, Price, Utah 84501

[22] Filed: Aug. 3, 1970

[21] Appl. No.: 60,361

[52] U.S. Cl. .............................................. 115/1 R
[51] Int. Cl. .................................................. B60f 3/00
[58] Field of Search ............ 180/5 R, 1 C, 11, 9.2 R; 115/1

[56] References Cited

UNITED STATES PATENTS

| | | | |
|---|---|---|---|
| 3,460,504 | 8/1969 | Boyce | 115/1 |
| 3,521,595 | 7/1970 | Mix | 115/1 |
| 2,914,016 | 11/1959 | Sweeny | 115/.5 A |
| 3,404,745 | 10/1968 | Smieja | 180/9.24 R |
| 3,521,717 | 7/1970 | Coons | 180/5 R |

Primary Examiner—Andrew H. Farrell
Attorney—Mallinckrodt & Cornaby

[57] ABSTRACT

A self-propelled water vehicle has a structural assembly which includes an elongate, water-tight hull adapted to provide seating for one or more persons along the top thereof and means, such as propellor or jet unit, for propelling the vehicle along the surface of a body of water. A control housing disposed at the forward end of the hull contains drive means operationally connected to the propelling means, and also encloses a steering control mechanism connected to a pair of pontoons disposed at opposite lateral sides, respectively, of the forward end of the hull. The pontoons are pivotally connected to the vehicle by support means. The vehicle is preferably constructed for conversion to a snowmobile by replacement of the pontoons and the water-tight hull, respectively, with pairs of skiis and an elongate snowmobile hull having endless track propelling means attached to the bottom thereof for propelling the vehicle over snow. In fact, existing snowmobiles may also be readily converted to the vehicle of the invention by use of the disclosed structural assembly.

8 Claims, 8 Drawing Figures

PATENTED JAN 2 1973          3,707,938

INVENTOR.
JOHN R. OLSON

BY Mallinckrodt and Cornaby
ATTORNEYS

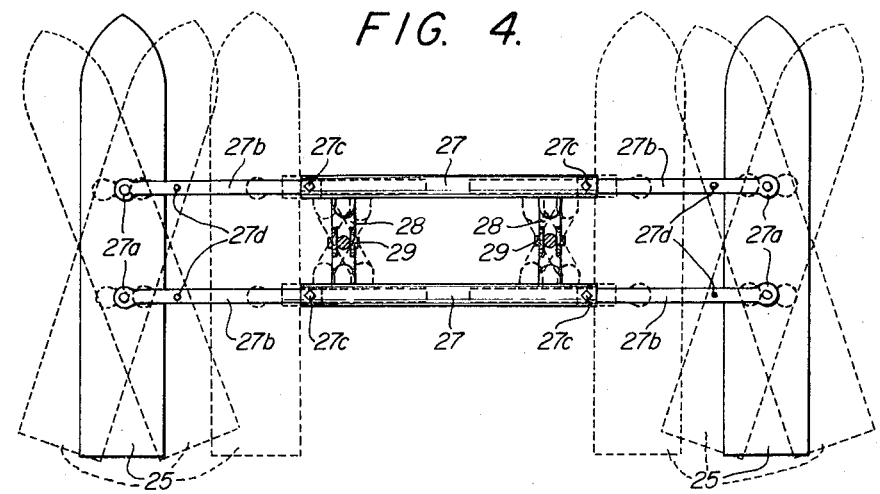
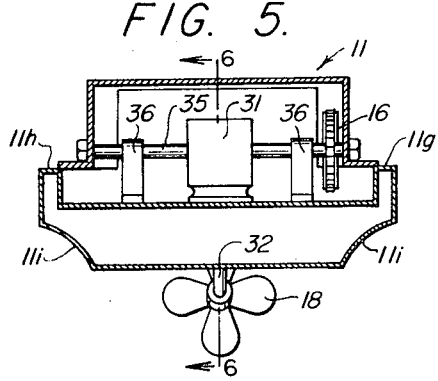
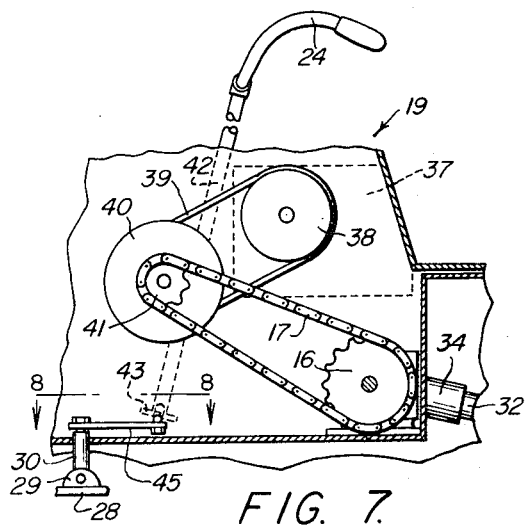
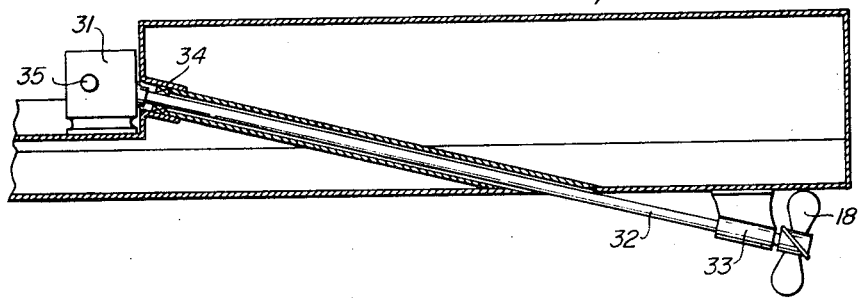
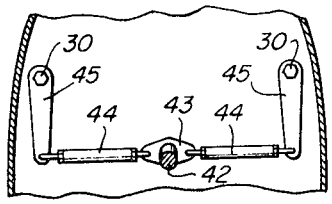
INVENTOR.
JOHN R. OLSON

SELF-PROPELLED WATER VEHICLE

BACKGROUND OF THE INVENTION

1. Field

This invention relates to self-propelled water vehicles, and particularly to water vehicles adapted to be converted into snowmobiles, and vice versa.

State of the Art

Small pleasure boats and other water craft have long been known and available to the public. With the recently renewed interest in water sports, such as water skiing and pleasure boating, the demand for a wider variety of water craft has greatly increased. A need has arisen particularly for a small and relatively inexpensive powered craft, which can be transported with ease to lakes and the like and can be easily maneuvered in the water while carrying one or two people. The power boats available today do not fill this need since they tend to be large, cumbersome, and expensive to purchase and maintain.

An additional problem inherent in pleasure boats is the relatively limited period of time during which they can be used. Such boats can be used only on water, and hence, cannot be used during the winter months. A similar disadvantage exists in connection with so-called "snowmobiles," which are propelled by one or more endless belt tracks for traveling across rugged, snow-covered terrain. These snow vehicles can be used only in the winter months when snow is on the ground, and must therefore be stored during the summer season.

OBJECTIVE

It was an objective in the making of this invention to produce a powered craft which can be used on water during the summer months and is convertible to a snowmobile during the winter.

SUMMARY OF THE INVENTION

A self-propelled water vehicle constructed according to the invention has an elongate, water-tight hull adapted to provide seating space along the top thereof for one or more persons. In a preferred embodiment the riders can sit astride the hull in a single file on cushions or the like. The forward end of the hull or bow preferably has a pointed configuration to provide less resistance to the water as the craft is propelled forward.

The hull has means for propelling the vehicle, such as a propeller or jet propulsion unit, appropriately connected to drive means located in a control housing on top of the forward end of the hull. The preferred drive means comprises an internal combustion engine coupled with a clutch assembly. Steering control means, for example a steering wheel or steering bar, is attached to the housing in convenient proximity to the foremost seating position on the hull and is connected to a pair of elongate pontoons pivotally mounted in mutually parallel relationship on opposite sides, respectively, of the underside of the forward end of the vehicle.

The vehicle lends itself easily to being converted into a snowmobile and vice versa. Such a conversion is made possible by constructing the hull and its contents as a unified, integral unit which is detachable from the control housing and the pontoons. All connections between the drive means in the housing and the propelling means in the hull are constructed so as to be easily disconnected from each other. Similarily, the pontoons are unitized to permit simple disconnection from the vehicle and from the steering means in the housing. The control housing can then be attached to a substitute snowmobile hull, similar in general shape to the hull of the water vehicle, and containing a snow traction mechanism.

In a preferred embodiment the control housing is permanently attached to an elongate bench extending rearwardly of the housing over the hull. The bench is adapted to provide seating along the top thereof and to permit either the water hull or snowmobile hull to be mounted along the underside of the bench. The snow traction mechanism is preferably one of the conventional endless belt tracks for travel over snow, and is connected to the drive means in the control housing. In place of the pontoons a pair of skiis are pivotally mounted on the vehicle and are attached to the steering means in the housing.

THE DRAWINGS

The best mode presently contemplated of carrying out the invention is illustrated in the accompanying drawings, in which:

FIG. 1, is a perspective view of a vehicle of the invention showing the elongate hull, the control housing and the pontoons;

FIG. 2, a perspective view of the hull as a unitized construction showing a partial view of the drive chain and sprocket;

FIG. 3, a perspective view of the pair of pontoons showing the support and pivoting means for pivoting the pontoons.

FIG. 4, a plan view of the pontoons taken from the standpoint of line 4—4, FIG. 1, depicting the pontoons pivoted in both right and left directions as shown by dotted lines, and also showing the location of the pontoons in dotted lines positioned closer to the vehicle hull;

FIG. 5, a vertical, transverse section of the hull taken along line 5—5 of FIG. 1, illustrating the location of the propeller, gear box, and drive sprocket in the hull;

FIG. 6, a longitudinal, vertical section of the hull taken along line 6—6 of FIG. 5 and showing the propeller, shaft, and gear box located within the hull;

FIG. 7, a vertical section of the control housing showing the drive means, steering means, and connecting linkages to the propelling means and pontoons; and FIG. 8, a horizontal section taken along line 8—8 of FIG. 7 showing the linkage that connects the steering means with the pontoons.

DETAILED DESCRIPTION OF THE DRAWINGS

Figure 1:
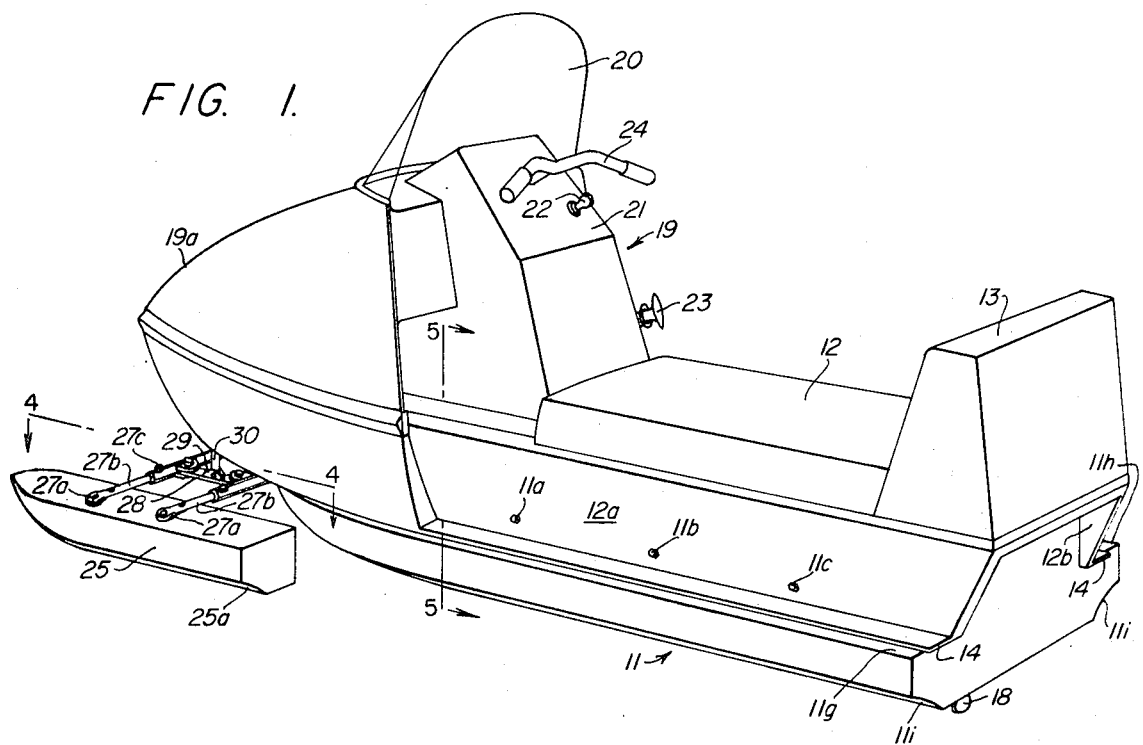
Figure 2:
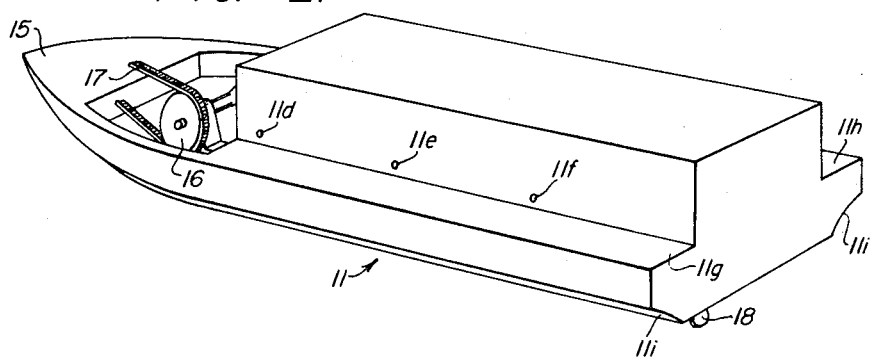
Figure 3:
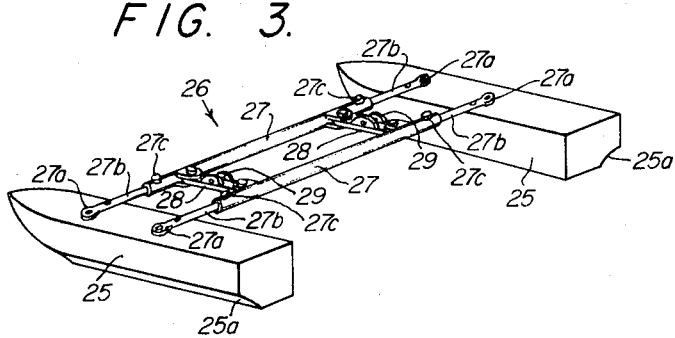

As illustrated in FIGS. 1, 2, and 3, a preferred embodiment of the water vehicle includes an elongate, water-tight hull 11, mounted beneath a padded bench 12 and a backrest 13. Bench 12 has side panels 12a, 12b extending longitudinally and downwardly along each side of the bench to form a receptacle for attachment of hull 11 by means of screws 11a, 11b, and 11c extending through sides 12a, 12b and into cooperating apertures 11d, 11e, and 11f in hull 11.

Hull 11 advantageously has a pointed bow 15 which enables the vehicle to move rapidly through water when in use. The hull also contains propelling means (described in detail below) including a drive sprocket 16, drive chain 17 and a propeller 18. Drive chain 17 is adapted to connect with the vehicle's drive mechanism when the hull is mounted under bench 12. An added feature for the safety of the vehicle is the inclusion of trip chines 11i, which are longitudinally extending concave depressions along the lower outside edges of hull 11. Chines 11i aid in stabilizing the vehicle in rough water when the vehicle changes direction of travel into oncoming waves by forcing the top of the waves to flow along the chines and underneath the vehicle.

At the top of the forward end of the hull 11 is the control housing 19, which is attached in this embodiment to the forward end of bench 12. Housing 19 is generally curved to a point at its forward end 19a to provide minimal wind resistance while in use. Housing 19 is preferably somewhat wider in its lateral dimensions than bench 12 so that the riders' feet and legs are protected from wind and splashing water by the curved forward section 19a of the housing. For further protection a windshield 20 can be attached to the upper portion of housing 19. A control panel 21 is located on the face of housing 19 convenient to the operator of the vehicle. Panel 21 has an ignition key 22 and a self-winding starter 23, and can have other appropriate switches and indicators to control the operation of the vehicle. A steering bar 24 extends from control panel 21 and is connected to pontoons 25 for controlling the direction of movement of the vehicle.

Two elongate, watertight pontoons 25 are pivotally mounted in mutually parallel relationship on opposite sides of the underside of the forward end of the vehicle. The pontoons can be constructed of any suitable material which floats on water, for example hollow, water-tight metal sheathing. As in the construction of hull 11, it is advantageous to provide pontoons 25 with trip chines 25a to achieve greater stability and less resistance in the water, especially when the pontoons are being turned to change direction of the vehicle. The pontoons are connected together by supporting means 26, which includes in this embodiment two parallel rods 27 extending transversely between both pontoons 25 and which are pivotally attached thereto by securing pins 25a. Two crossbars 28 pivotally interconnect rods 25. Each crossbar 28 has a bracket 29 approximately mid-length thereof which opens upwardly to receive an upwardly extending support rod 30.

Support rods 30 are connected at one end to brackets 29 so that pontoons 25 can pivot about a horizontal axis with respect to rods 30, but are rigid in the vertical axis. At their opposite ends, rods 30 are connected with steering bar 24 through connecting means described below.

As illustrated in FIGS. 3 and 4, the steering mechanism in this embodiment permits both pontoons 25 to be pivoted in either lateral direction about a vertical axis when rotated by support rods 30. Upon rotation, support rods 30 extend transverse rods 27 logitudinally in opposite parallel directions, so that the rearward ends of both pontoons 25 are pulled in one lateral direction and the forward ends of both pontoons are pushed in the opposite direction, as shown by the dotted lines in FIG. 4. An additional feature of the invention provides for lateral extension of the transverse rods 27, by means of extension rods 27b, enabling pontoons 25 to be positioned at any desired location laterally of hull 11, as shown by the dotted line position of the pontoons interiorly of the previously described position in FIG. 4. It is convenient when transporting the vehicle on a trailer, for example, to have the pontoons as close to hull 11 as possible, thereby conserving valuable space in the trailer. Adjustment of rods 27b is easily accomplished by extending the rods into the hollow interiors of rods 27, as illustrated by the dotted line positions in FIG. 4, and tightening screws 27c, located near the ends of rods 27, into the apertures 27d provided therefor in extension rods 27b.

FIGS. 5 and 6 show the relative positions of the elements comprising the propelling means in hull 11. Propeller 18 is connected to a gear box 31 by means of a shaft 32 extending upwardly and forwardly through hull 11 from the propeller to the gear box. At its lower end, shaft 32 extends through a bushing 33 fixedly secured to the underside of hull 11. Near its upper end, shaft 32 is rotatably secured within hull 11 by a second bushing 34. Gear box 31 is mounted on hull 11 and has a shaft 35 extending transversely of the hull and mounted on bearings 36 for transferring rotational drive from sprocket 16 to gear box 31, where the rotation is transferred to shaft 32.

The interior of housing 19, as illustrated in FIG. 7, contains the internal combustion engine 37. Engine 37 has a drive wheel 38 which is connected by a drive belt 39 to a clutch assembly 40. Clutch assembly 40 can have a brake shoe contained therein, so that the necessary braking equipment is present when the snowmobile traction mechanism is attached. A sprocket 41 connects clutch 40 through drive chain 17 with sprocket 16. When hull 11 is separated from the vehicle, the drive train is conveniently broken by disengaging chain 17 from sprocket 41.

The portion of the steering mechanism within housing 19 is depicted in FIGS. 7 and 8, and includes a bar 42 extending downwardly through housing 19 from steering bar 24 to a collar 43 near the bottom of housing 19. Bar 42 is fixedly attached to both steering bar 24 and collar 43, so that when steering bar 24 is turned, collar 43 revolves. Pivotally attached to respective opposite lateral sides of collar 43 are two guide bars 44 which extend transversely of housing 19 and are pivotally connected at their outer ends with the ends of a pair of guide plates 45. Guide plates 45 extend forwardly along each lateral side interiorly of housing 19 and are fixedly attached at their free ends to the upper ends of downwardly extending support rods 30. As collar 43 is activated by steering bar 24, guide bars 44 and guide plates 45 are moved to rotate support rods 30 and so pivot pontoons 25 to change the direction of motion of the vehicle when in use.

While the detailed description of the embodiment set forth above relates to a water vehicle which is convertible to a snowmobile, it should be understood that the inventive concepts can be used to convert existing snowmobiles to water vehicles. This is easily accomplished by removing the pair of skiis and the snowmobile hull containing the snow traction mechanism from the snowmobile, and replacing them, respectively, with a pair of pontoons and the elongate, watertight hull assembly which is adapted according to the invention for mounting in the receptacle under the snowmobile's elongate seating bench. It is also to be understood that many other variations are possible without departing from the inventive concepts particularly pointed out in the claims.

I claim:

1. A structural assembly for converting a snowmobile having a drive means, a pair of skiis, and a hull containing a snow traction mechanism, into a water vehicle, comprising:
   an elongate, water-tight hull adapted to be mounted in a hollow receptacle located beneath the seating bench of the snowmobile in place of the snowmobile hull; and
   propelling means attached to the water-tight hull for moving the water vehicle through water, said propelling means being adapted to be connected to drive means located within the snowmobile.

2. A structural assembly as set forth in claim 1, including a pair of elongate water-tight pontoons adapted to be attached to the steering mechanism of the snowmobile in place of the pair of skiis.

3. A structural assembly as set forth in claim 1, wherein the propelling means comprises a propeller mounted on the bottom of the water-tight hull.

4. A self-propelled water vehicle, comprising in combination:
   a structural assembly as set forth in claim 1;
   an elongate seating bench attached to the top of the water-tight hull;
   a control housing attached to the forward end of the seating bench and disposed at the forward end of the water-tight hull;
   drive means mounted in the control housing and operatively connected to the propelling means in the water-tight hull;
   a steering mechanism including a pair of elongate, water-tight pontoons disposed, respectively, at opposite lateral sides of the forward end of the hull in parallel relationship with each other, pontoon support means connected to the vehicle, and means pivotally mounting the pontoons in the support means for pivotal movement along respective vertical axes; and
   a steering control mechanism mounted in the control housing and operatively connected to the pivotal mounting means.

5. A self-propelled water vehicle as set forth in claim 4, wherein the drive means includes an internal combustion engine.

6. A self-propelled water vehicle as set forth in claim 4, including a pair of lateral footrests extending respectively along opposite longitudinal sides of the water-tight hull.

7. A self-propelled vehicle as set forth in claim 4, wherein the control housing has a wider transverse dimension than the bench.

8. A self-propelled vehicle as set forth in claim 4, including additional support structure for laterally extending the pair of pontoons respectively in opposite directions.

* * * * *